No. 729,882. PATENTED JUNE 2, 1903.
A. MÉGROZ.
ELECTRIC TRACTION.
APPLICATION FILED NOV. 25, 1902.

NO MODEL.

Inventor
Auguste Mégroz

Witnesses

No. 729,882. Patented June 2, 1903.

UNITED STATES PATENT OFFICE.

AUGUSTE MÉGROZ, OF CLARENS, SWITZERLAND.

ELECTRIC TRACTION.

SPECIFICATION forming part of Letters Patent No. 729,882, dated June 2, 1903.

Application filed November 25, 1902. Serial No. 132,743. (No model.)

*To all whom it may concern:*

Be it known that I, AUGUSTE MÉGROZ, engineer, a citizen of the Swiss Republic, and a resident of Clarens, Canton de Vaud, Switzerland, have invented new and useful Improvements in Electric Traction, of which the following is a full, clear, and exact specification.

The present invention relates to a system for supplying cars with electricity by using a conduit placed freely a little above the level of the rails, and more particularly to the construction of this conduit by which especial protecting-cases are dispensed with, though attendants or other persons crossing the line are sufficiently protected from contact. Further, by the new construction the cost of the installation, as well as the space wanted for the arrangement of the conduit, are reduced.

According to the present invention the conduit is formed itself of two iron conductors closely covered on their whole length on the top and on the sides by an insulating protecting-covering. The latter is applied in such a manner that only an interior part of the conduit remains bare, allowing the contact of the current-collecting device carried by the car, while the said part is not accessible to the attendants of the line or to persons crossing the rails.

The annexed drawings represent, by way of example, a constructional form of the subject of invention.

Figure 1:
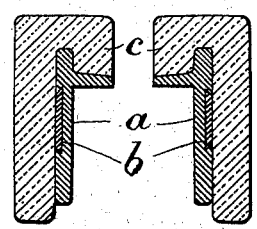
Figure 2:
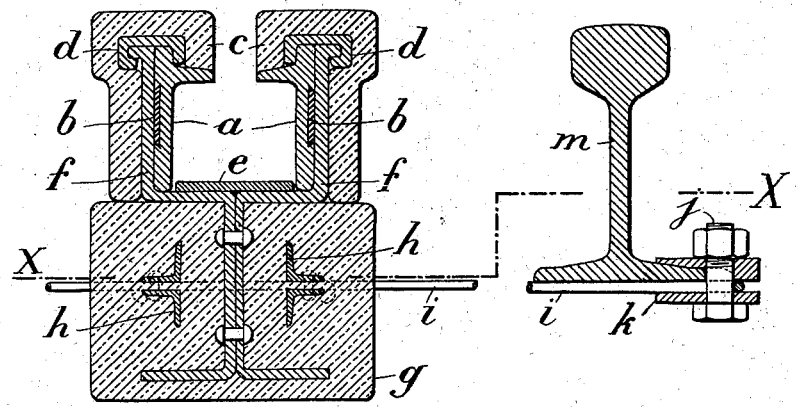
Figure 3:
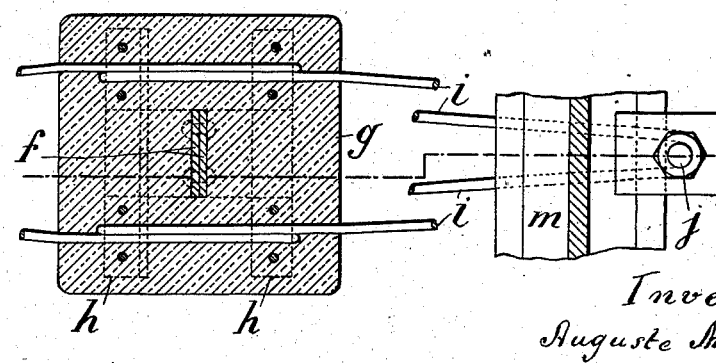

Figure 1 shows a vertical cross-section of the conduit, taken at a place situated between the insulating-supports provided for the said conduit. Fig. 2 is a vertical cross-section through the conduit and one of its supports and shows also a convenient connection of this conduit support with the rails. Fig. 3 is a horizontal section on line X X of Fig. 2.

With reference to Figs. 1 and 2, the current-supplying conduit is formed of two parallel rolled iron bars $a$, arranged a little above the road and provided on their insides with a flange, on the under side of which the current-collecting device slides. Externally the bars $a$ are furnished with a sheet or strip $b$ of a metal of higher conductibility than that of iron—as, for instance, copper or aluminium—which strip may be secured on the bars $a$ by means of rolling, screwing, riveting, or the like. The object of this construction is to reduce the weight of the conductors, while, however, a good conductivity of the same is maintained or obtained. The conduit arranged in the middle between the rails is placed at suitable distances on insulating-supports, the construction of which will be hereinafter explained. Between these supports the conduit possesses the simple cross-section represented in Fig. 1. Externally on the top and on the sides the iron bars $a$ are directly covered by a protecting and insulating covering $c$, preferably applied to them by sticking and intended to prevent any dangerous contact with the conducting parts of the circuit. At those places where the conduit is carried above the mentioned insulating-supports (see Fig. 2) the iron bars $a$ are inserted without any alteration of their distance in a sort of fork. On the top part they are held by cramps $d$, engaging from above the upper edges of the iron bars and of the prongs of this fork, while a strip $e$, simply lying on the bottom of the said fork, maintains the distance of the two iron bars. The whole of the fork and the iron bars is covered on the top and on the sides with the protecting-covering $c$ of an insulating material for the sake of security, this covering being carefully connected with the adjacent parts of the covering of the free conduit.

The fork containing the iron bars and forming by this way a constituent part of the supports of the conduit consists of two bent irons $ff$, riveted together, the shape of which will be clearly understood from Fig. 2. These irons $ff$ rest by a horizontal part on a solid block $g$ of insulating material surrounding completely their under parts and forming an insulating-support. The insulating-block $g$ contains besides two angle-pieces $h$, placed facing one another and intended as a connection of the block with the rails or with parts rigidly connected with the later. For this purpose the pieces $h$ are rigidly connected with the outer parts of the rails by means of bent metal rods $i$, which are fastened with their hooked end on the said pieces $h$ and which surround the bolts $j$ with their bent parts. The bolts, together with a plate $k$, press the corresponding rods closely against the foot of the rail $m$. (See Fig. 2 and 3.) The blocks *g* are preferably arranged in cavities provided in the ground of the road, the surface of which is nearly on the level of the connecting-rods *i*.

The illustrated conduit is adapted for supply with direct current; but if it is to be used with alternating current all that is necessary is to place the two iron bars *a* on different insulating-supports independent one from the other.

What I claim is—

1. In an electric traction system, a current-supplying conduit laid above the surface of the roadway, said conduit consisting essentially of two parallel, metal feeding-conductors, and an insulating-covering on and extending the entire length of each of said conductors, said insulating material covering only the upper and outer exposed surfaces of the conductor and leaving the inner surface of the latter bare or naked for contact with the current-collecting device, whereby the attendants of the railway and others are protected by said covering from contact with the conductor.

2. In an electric traction system, a conduit supported a little above the surface of the roadway, said conduit consisting essentially of two parallel, metal feeding-conductors, and an insulating protecting-covering which extends the entire length of each conductor and covers its outer, exposed surface, the inner surface thereof being left bare for contact with the current-collecting device, in combination with the supporting means for said conduit, said supporting means comprising an insulating-block and a metal bracket, the upper part of the latter embracing the conduit and the lower part thereof being embedded in said block, the upper part of said bracket being covered by the insulating material of the conduit.

3. In an electric traction system, the combination with a conduit consisting of two parallel, metal feeding-conductors, and insulating protecting-coverings on the outer, exposed faces of the said conductors, of spaced insulating-supports for said conduit, and means rigidly connecting said supports with the running-rails of the track, said conduit being supported a little above the surface of the roadway.

4. In an electric traction system, a conduit consisting of two parallel, iron feeding-conductors, an insulating protecting-covering on the outer, exposed surfaces of said conductors, and a strip of metal of higher electric conductivity than iron on each conductor and extending lengthwise of the same, substantially as and for the purpose set forth.

In witness whereof I have hereunto signed my name, this 13th day of November, 1902, in the presence of two subscribing witnesses.

AUGUSTE MÉGROZ.

Witnesses:
 GEO. GIFFORD,
 AMAND RITTER.